United States Patent [19]  [11] Patent Number: 4,977,550
Furuya et al.  [45] Date of Patent: * Dec. 11, 1990

[54] DISC PLAYBACK APPARATUS FOR PLAYBACK OF MUSIC AND DIGITAL DATA

[75] Inventors: Tsuneo Furuya, Kanagawa; Shunsuke Furukawa, Tokyo; Katsuya Hori, Kanagawa, all of Japan

[73] Assignee: Sony Corporation, Tokyo, Japan

[*] Notice: The portion of the term of this patent subsequent to May 6, 2003 has been disclaimed.

[21] Appl. No.: 291,415

[22] Filed: Dec. 22, 1988

Related U.S. Application Data

[63] Continuation of Ser. No. 767,798, Aug. 14, 1985, abandoned.

[30] Foreign Application Priority Data

Dec. 16, 1983 [JP] Japan ................................. 58-237370
Dec. 23, 1983 [JP] Japan ................................. 58-243486

[51] Int. Cl.$^5$ ............................................. G11B 21/10
[52] U.S. Cl. ........................................ 369/32; 369/50; 369/59; 360/36.2; 360/78.04
[58] Field of Search ....................... 369/30, 32, 33, 41, 369/43, 44, 47–50, 59; 371/38, 40, 37.4; 360/10.1–10.3, 11.1, 18, 19.1, 32, 36.1, 362, 38.1, 39, 40, 48, 49, 78.04, 72.2; 358/352, 907

[56] References Cited

U.S. PATENT DOCUMENTS

| | | | |
|---|---|---|---|
| 4,141,039 | 2/1979 | Yamamoto | 360/32 |
| 4,376,291 | 3/1983 | Heitmann | 360/36.2 |
| 4,495,474 | 1/1985 | Nishikawa et al. | 369/59 |
| 4,512,006 | 4/1985 | Murakami et al. | 369/50 |
| 4,541,093 | 9/1985 | Furuya et al. | 369/49 |
| 4,587,643 | 5/1986 | Monen et al. | 369/32 |
| 4,603,412 | 7/1986 | Yamazaki | 369/50 |
| 4,613,965 | 9/1986 | Hori et al. | 369/59 |

FOREIGN PATENT DOCUMENTS 0093969 11/1983 European Pat. Off.
58-105472 6/1983 Japan.
2107557 4/1983 United Kingdom ................. 369/59

OTHER PUBLICATIONS

Patent Abstracts of Japan vol. 6, No. 125, P, p. 72, 57-5034, 3/82, Koyama.
Patent Abstracts of Japan vol. 3, No. 5, E, p. 161, 53-133011, 11/78, Iga.
Patent Abstracts of Japan vol. 7, No. 249, P, p. 93, 58-133691, 8/83, Hori.
Patent Abstracts of Japan vol. 6, No. 70, P, p. 43, 57-8864, 1/82, Furuya.

Primary Examiner—Aristotelis M. Psitos
Assistant Examiner—Steven R. Garland
Attorney, Agent, or Firm—Hill, Van Santen, Steadman & Simpson

[57] ABSTRACT

Apparatus for playback from a disc on which main digital data and subsidiary digital data for selectively reproducing of the main digital data have been recorded in multiplex fashion incorporates a write clock generator for generating a write clock synchronized with a reproduced signal from the disc, a read clock generator for generating a read clock having a predetermined period, a buffer memory into which main digital data and subsidiary digital data reproduced from the disc are written and read out in response to the read clock so as to de-interleave the main digital data, and a control unit for seeking a position to be reproduced in the main digital data in response to the subsidiary digital data read out from the buffer memory. The buffer memory into which the subsidiary digital data is written may be a FIFO buffer register which is provided separately from the buffer memory into which the main digital date is written.

4 Claims, 8 Drawing Sheets

DISC PLAYBACK APPARATUS FOR PLAYBACK OF MUSIC AND DIGITAL DATA

This is a continuation of application Ser. No. 767,798, filed Aug. 14, 1985, now abandoned.

TECHNICAL FIELD

This invention relates to an apparatus for playback of discs on which digital data is recorded.

BACKGROUND ART

The system employing an optically encoded digital audio disc (referred to hereafter as a compact disc) is capable of reproducing stereo music of high quality. In such a disc system, if digital data such as data representing characters, display data, or computer program data other than music, or in addition to at least one channel of music can be reproduced without significant change in the structure of a player, then a playback apparatus for visual information such as chart, or statistics by graphics, or picture books of still images, and/or video games could be achieved merely by adding a display device, for example. In this way, the applications of the compact disc system could be extended. The storage capacity of current compact discs is approximately 500M bytes which is advantageously larger than that of conventional flexible discs.

On the other hand, in conventional compact discs, the data is retrieved in relatively large units such as an entire music composition or a passage thereof, since reproduction of audio signals are concerned. It is necessary, however, to read out data in a precise units ranging from 128 bytes to 10K bytes from a a general data storage device.

In the case of music signals, searching accuracy can afford to be relatively low without noticeably affecting the reproduced sound. Therefore, in the conventional reproducing apparatus, audio data of the reproduced signal from the compact disc are once written into a buffer memory so as to be subjected to error correction and to eliminate jitter in the time base. Since a high searching accuracy is not required in a subcoding signal as mentioned above, time base jitter is not eliminated in order to reduce manufacturing costs. Accordingly, there is a problem that if the compact disc is to be used as a data memory, a read address cannot be specified accurately solely by means of the subcoding signal.

DISCLOSURE OF THE INVENTION

Accordingly, an object of this invention is to provide a disc playback apparatus which employs, for example, a conventional digital disc system for audio use and is capable of reading out digital signals, such as computer programs, data and so on instead of digital audio data signals.

Another object of this invention is to provide a disc playback apparatus which can constructed at low cost by employing a buffer memory used in de-interleaving of the digital data of the main channel.

Still another object of this invention is to provide a disc playback apparatus which is rendered capable of addressing the digital signals of the main channel simply by adding an external circuit without changing the reproducing processing circuitry of the conventional compact disc.

In order to achieve the above objects, this invention provides an apparatus for playback of a disc on which main digital data and subsidiary digital data for selectively reproducing the main digital data are recorded in multiplex fashion, and the apparatus comprises means for generating a write clock synchronized with a reproduced signal from the disc, means for generating a read clock having a predetermined period, a buffer memory into which main digital data and subsidiary digital data reproduced from the disc are written, and are read out in response to the read clock, so that the main digital data is de-interleaved, and control means for searching a position to be reproduced of the main digital data on the basis of the subsidiary digital data read out from the buffer memory.

Furthermore in this invention, a disc playback apparatus comprises means for generating a write clock synchronized with a reproduced signal from the disc, means for generating a read clock having a predetermined period, a buffer memory into which main digital data reproduced from the disc is written in response to the write clock, and read out in response to the read clock, a FIFO buffer register into which the subsidiary digital data reproduced from the disc is written, in response to the write clock, and read out in response to the read clock, and control means for seeking a position to be reproduced of main digital data on the basis of the subsidiary digital data read out from the FIFO buffer register.

BEST MODE FOR CARRYING OUT THE INVENTION

Figures 1, 2:
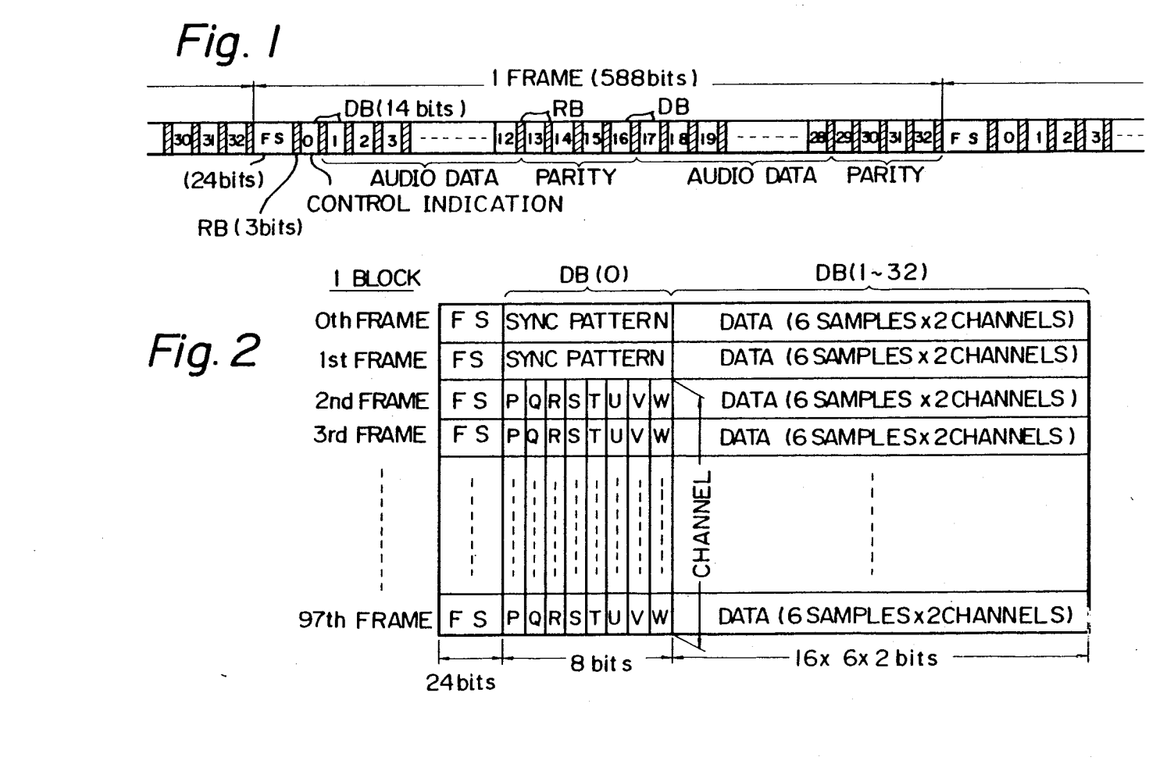
FIGS. 1 and 2 are schematic diagrams for use with an explanation of an arrangement of data recorded in a compact disc applied with this invention.

An embodiment of the invention is applied to the compact disc. Referring to FIGS. 1 and 2, the data construction of signals stored in the compact disc will be described.

FIG. 1 illustrates a data stream as stored in the compact disc. One frame consists of 588 bits of data which is recorded and includes a frame synchronizing pulse FS of a particular bit pattern, followed by the first direct-current component constraint bits group RB consisting of 3 bits. Next, 0th to 32nd groups of data bits DB each consisting of 14 bits and groups of direct-current component constraint bits RB each consisting of 3 bits are provided alternately. The 0th data bits DB constitute a subcoding signal or user's bits which serves for controlling disc playback or indicating related informations. The 1st to 12th and 17th to 28th groups of data bits DB are allocated to audio data in a main channel, and the rest, 13th to 16th and 29th to 32nd groups of data bits DB are allocated to parity data for error correction of the main channel. Each group of data bits DB has 14 bits of data which have been interleaved and then converted from 8 bits data by an 8–14 modulation technique (EFM) during recording.

The EFM modulation is a method for block-convertig 8 bits data into preferable patterns each of 14 bits (namely, to extend the minimum transition interval of the modulated signal and to suppress the low frequency component thereof). A demodulator 22 described later is constructed to demodulate the EFM.

FIG. 2 shows reproduced one block consisting of parallel arranged successive 98 frames in which direct current component constraint bits RB are excluded, and each group of data bits DB is demodulated by 8–14 modulation so as to be 8 bits and the parity data are also excluded. The subcoding signals consists of P to W, each of 1 bit, with a total of 8 bits of data for every frame. In the first two frames, the subcoding signals P to W constitute synchronizing patterns having paticular bit patterns. With respect to each channel (shown vertically in FIG. 2), one block is comprised of 98 bits, and the last 16 of the 98 bits constitute an error detectiion CRC code.

The P-channel is a flag of 1 bit indicating whether the frame is a pause or music, and a high level indicates a pause, a low level indicates music and a 2 Hz pulse indicates a lead-out section, so that the detecting and counting of the P-channel bits makes the selection of a designated musical piece possible The Q-channel performs a similar but more complicated control Specifically, the Q-channel information can be supplied to a microprocessor built into the disc playback apparatus to allow such a random music selection as to reproduce another music section in the middle of reproduction of the currently selected music. The remaining channels R through W, as a whole, constitute regions for data indicating the songwriter, composer, text and an explanation of a music recorded on the disc with display or voice.

Concerning the Q-channel, the first 2 bits serve as part of the synchronizing signal pattern, the next 4 bits serve as control bits, the following 4 bits serve as address bits, and the subsequent 72 bits serve as data bits, and the final 16 bits serve as a CRC code for error detection.

The data bits of 72 bits include a a track number code TNR and a index code X. the track number code TNR varies from 00 to 99. The index code X varies also from 00 to 99. The data bits of the Q-channel also include a time indication code indicating the duration of the musical selection and pauses and another time indication code indicating the absolute time duration continuously varying from the first of the program area to the outer peripheral end of the compact disc. These time indication codes constitute codes representing, each with two digits, minutes, seconds, and frames. One second is divided into 75 frames. The another time indication code with respect to the absolute time is used for access digital data in units shorter than an entire musical selection from the compact disc.

In this embodiment, when digital data is recorded as data in a main channel, the data structures of the P-channel and Q-channel in the subcoding signal are the same as that of the conventional compact disc.

The detailed data structures of the above-described subcoding signals are disclosed in Japanese Laid-open Patent Publication No. Sho. 58-48279, U.S. patent application Ser. No. 416,684 now U.S. Pat. No. 4,496,997 and EPC Laid-open Patent publication No. 74841.

Figure 3:
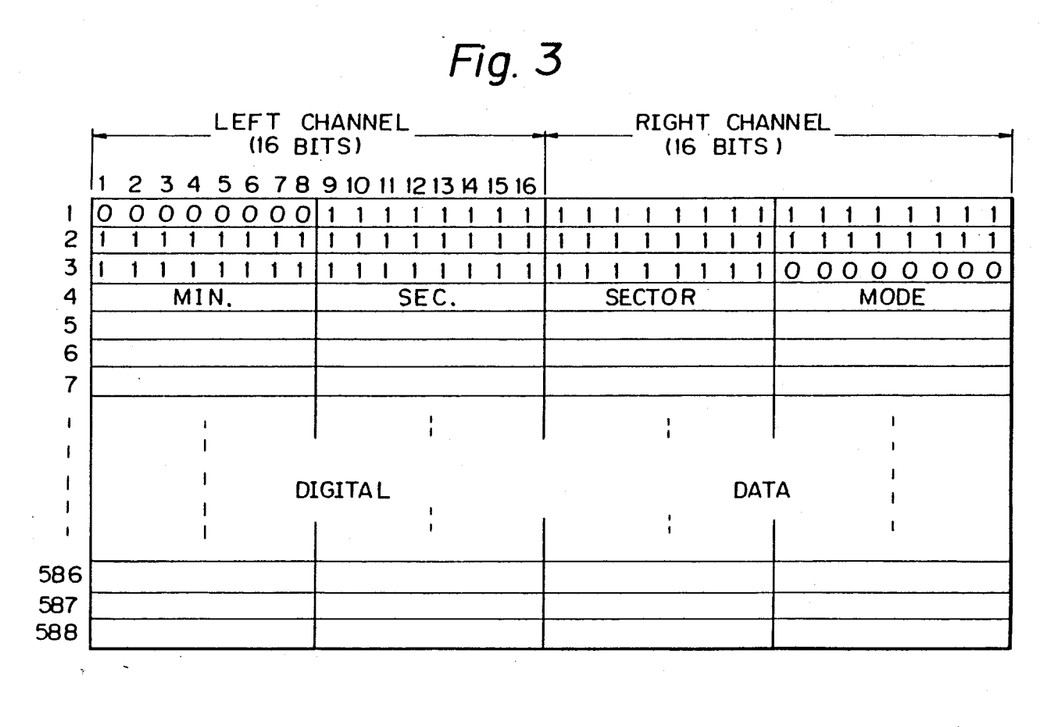
FIG. 3 is a schematic diagram showing one block of digital data when digital data according to one embodiment of this invention is recorded.

The FIG. 3 illustrates the recording format of the digital data recorded in the main channel. The digital data comprises 2352 bytes ($=588\times 4$ bytes) as an unit which is one block. In FIG. 3, the left channel and right channel as described indicate correspondence to the sampling data of the left and right channels of stereo musical data. In case of stereo musical data, as above described, since 24 ($=6\times 2\times 2$) bytes of data are recorded within the period defined by consecutive frame synchronizing signals, if other digital data is recorded in the same format (referring to FIG. 1) as for stereo musical data, the data of one block (2352 bytes) is recorded so as to coincides with the amount of data in frames of from 0th to 97th. Accordingly, the digital data can be recorded without disrupting the 98-frame cycle of the variation of the subcoding signals.

The first byte of the digital data of one block is all zeros and the next ten bytes are all ones, followed finally by another byte of zeros. These 12 bytes constitute a header indicating the beginning of one block of the digital data. The header is followed by minutes data, seconds data, sector data and mode data, each of one byte. The minute, second and sector bytes specify one block address, with the 75 sectors counting one second equal to 75 frames. The mode data indicates the kinds of digital data in the block. The remaining 2340 bytes comprises diital data such as still picture data other than the header, address (minutes, seconds, sector) and mode.

Figure 4:
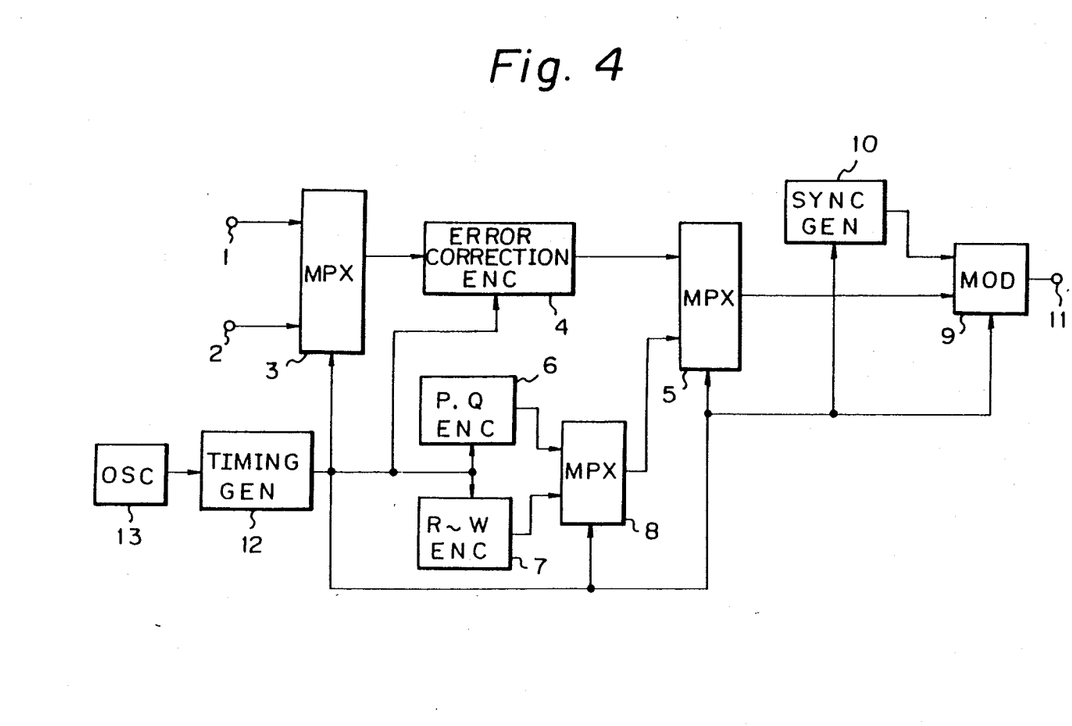
FIG. 4 is a block diagram showing a structure of a recording circuit for generating signals to be recorded on a disc.

FIG. 4 shows the circuitry of a recording circuit for forming the digital data to be recorded on the compact disc. In FIG. 4, reference numerals 1 and 2 designate input terminals supplied with digital data of 16 bits, respectively. The digital data is converted into one channel data form by means of a multiplexer 3 and is supplied to an error correction encoder 4. The error correction encoder 4 encodes audio PCM signals by a cross-interleaving process using a Reed-Solomon code to facilitate later error corrction. The cross-interleaving process is to rearrange the order of the data, so that each symbol is included in two different error correction code systems. The output of the error correction encoder 4 is supplied to a mutiplexer 5.

An encoder 6 for the P-channel and Q-channels of the subcoding signals and an encoder 7 for the R- through W-channels of the subcoding signals are provided, the output of which are multiplexed by a multiplexer 8 and supplied to the multiplexer 5. The output of the multiplexer 5 is supplied to a modulator 9 and modulated by (8-14) conversion. At this time, a frame sync from a synchronizing signal generator 10 is mixed and supplied to an output terminal 11. The encoder 6 for the Q-channel is designed so as to add a CRC code of 16 bits to the Q-channel subcoding signal. The encoder for the R-through W-channels is designed so as to encode an error correction code which employs a Reed-Solomon code with interleaving different from that of the main channel.

The circuits such as the multiplexers 3, 5, 8 are supplied with clock pulses and timing signals generated by a timing generator 12. A reference numeral 13 designates an oscillator for generating a master clock.

Figure 5:
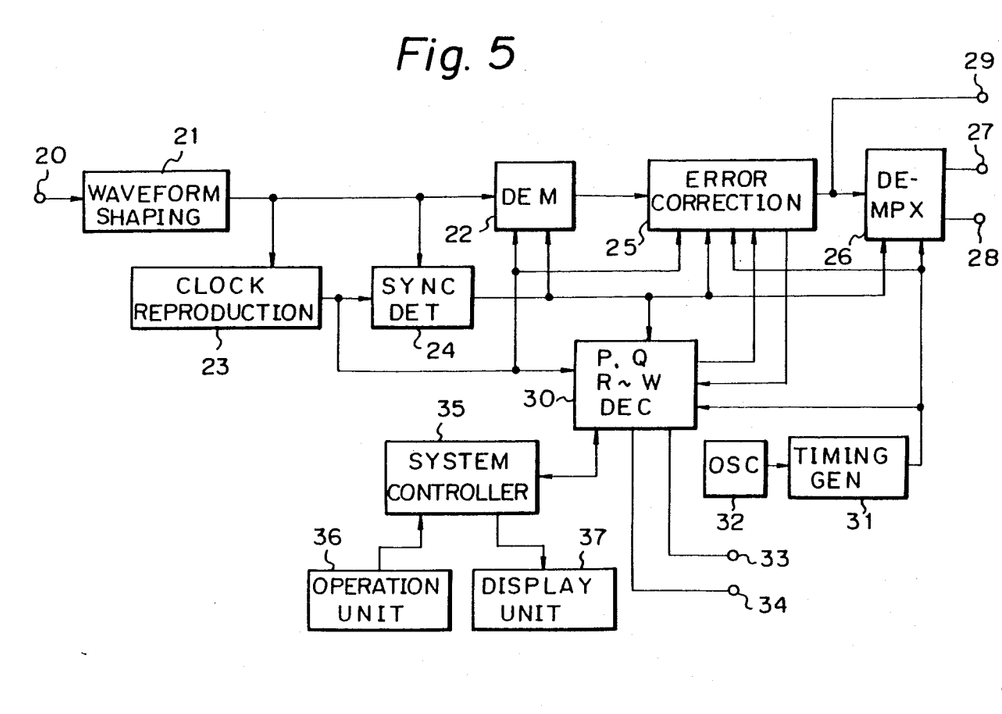
FIG. 5 is a block diagram showing a reproducing circuit to which the reproduced signals from a disc is supplied.

FIG. 5 shows a reproducing circuit structure for processing a reproduced signal from the compact disc. An input terminal designated by a reference numeral 20 is supplied with the signal optically reproduced from a disc.

The reproduced signal is supplied to a demodulator 22, clock reproducing circuit 23, and a synchronization detecting circuit 24 through a wave form shaping circuit 21. A bit clock is extracted from the clock reproducing circuit 23 with a PLL structure in synchronism with the reproduced data. The synchronization detecting circuit 24 detects the frame synchronizing signal so as to generate a frame clock in synchronism with the sampling data. The bit clock and frame clock are supplied to each circuit of the reproducing system.

The demodulation of 8-14 modulation by modulator 9, that is 14-8 demodulation is processed in the demodulator 22, and each output data of 8 bits is subjected to de-interleaving processing corresponding to the interleaving processing carried out by the error correction encoder 4, and to error detection, error correction and interpolation processing in the error correcting circuit 25. The error correcting circuit 25 includes a RAM, a RAM controller and an error correction circuit. The RAM stores the subcoding signals as well as digital data in the main channel. The write process of the RAM is perfomed in response to the bit clock and frame clock from the clock reproducing circuit 23 and synchronization detecting circuit 24. Similarly, the digital data of the main channel and subcoding signal are read from the RAM in response to a read clock from a timing generator 31. The read clock is generated from a crystal oscillator 32.

Therefore, the digital data of the main channel and the subcoding signal from which time base jitter are cancelled, respectively, derive from the error correction circuit 25. The digital data of the main channel from the error correcting circuit 25 is supplied to the demultiplexer 26 so as to be divided into two channels supplied to corresponding output terminals 27 and 28 respectively. In the case where the main channel signal is general digital data, the data is outputted serially from another output terminal 29. The subcoding signal is supplied to a decoder 30 so as to be subjected to the error detection and error correction processing.

A system controller 35 is supplied with P-channel and Q-channel data of the subcoding signal from the decoder 30. With respect to the system controller 35, an operation device 36 such as a keyboard is attached, and a line display 37 is supplied with a time code for displaying the absolute time encoded in the Q-channel of the subcoding signal. A key-in operation from the operation device 36 permits digital data of a desired address represented by the time code to be reproduced from the disc. Alternatively, a command from an external computer to which the digital data of the desired address is supplied may be sent to the system controller 35 via an I/O interface. Moreover, the P-channel and Q-channel data are supplied to another output terminal 33, and the R-through W-channel data are supplied to another output terminal 34. The R- through W-channel data may be still picture data, audio data concerning explanation of the music selection and so on.

Write and read operations of the RAM in the error correcting circuit 25 of the reproducing system mentioned above will be now described with reference to FIG. 6 and FIGS. 7A to 7E. In order to simplify the description, one frame will be assumed to consist of a total of five symbols, four symbols in the main channel and one symbol for the subcoding.

Figure 6:
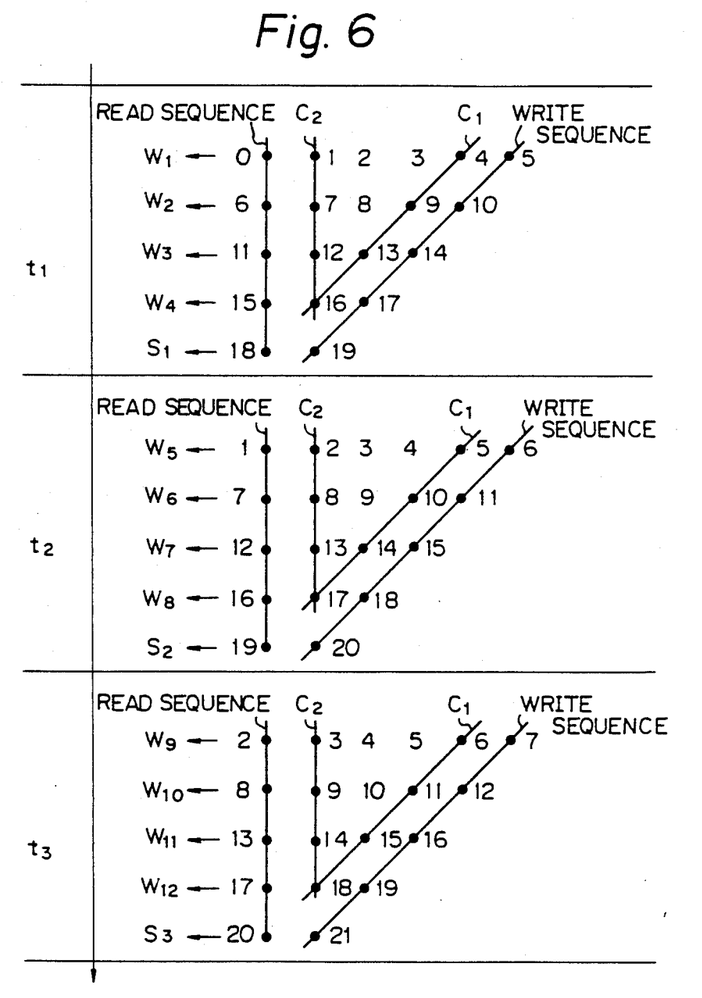
FIGS. 6 and 7A to 7E are a schematic diagram and time charts for use with an explanation of time base jitter cancellation and de-inteleaving in a reproducing circuit.

FIG. 6 shows the contents of RAM in three successive frames timings t1, t2 and t3. The numerals in FIG. 6 represent address information. At a frame timing t1, reproduced data of one frame is written into the addresses (5, 10, 14, 17, 19) of the RAM. One symbol of the subcoding signal is written into the address 19. At the frame timing t1, the digital data of the main channel written into the addresses (4, 9, 13, 16) at the preceding frame timing are subjected to an error correction, using the series C1. At this time, the digital data in the addresses (1, 7, 12, 16) are subjected to an error correction using the series C2. Furthermore, in the frame timing t1, the digital data of 4 symbols W1, W2, W3, W4 in the addresses (0, 6, 11, 15) subjected to an error correction with one subcoding signal S1 in the address 18, are read out from the RAM.

At the subsequent frame timing t2, the digital data of 4 symbols W5, W6, W7, W8 subjected to an error correction and to the de-interleaving with one subcoding signal in the in the addresses (1, 7, 12, 16, 19), are read out from the RAM. The digital data in the addresses (5, 10, 14, 17) written at the frame timing t1 are now subjected to an error correction using series C1, and the digital data in the addresses (2, 8, 13, 17) are subjected to an error correction using the series C2. Furthermore, reproduced data of one frame are written into the addresses (6, 11, 15, 18, 20).

Furthermore, at the subsequent frame timing t3, the digital data of 4 symbols W9, W10, W11, W12 subjected to an error correction and to the de-interleaving and one subcoding signal S3 are written into the addresses (2, 8, 13, 17, 20), and reproduced data of one frame are written into the addresses (7, 12, 16, 19, 21).

Figure 7A:
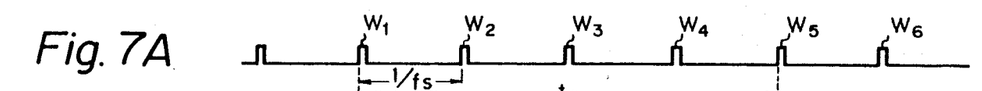
Figure 7B:
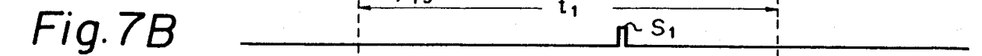
Figures 7C, 7D:
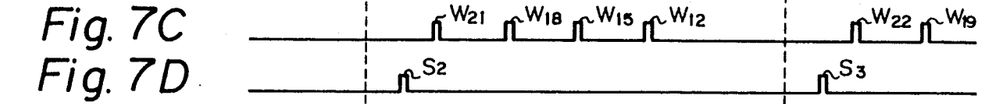
Figure 7E:
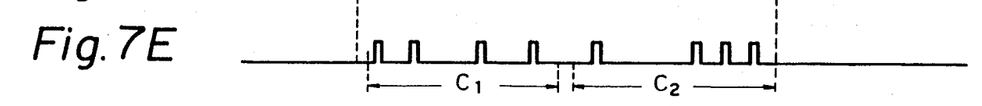

The write operation of the RAM is performed in response to the clock signal in synchronism with the reproduced data and the read operation of the RAM is performed in response to the clock signal generated from the output of the crystal oscillator, so that the digital data and subcoding signals read out from the RAM are subjected to the same compensation of time base jitter. As shown in FIG. 7A, the read out timing of the digital data from the RAM is carried out at a constant period of 1/fs (fs=44.1 kHz). Simultaneously, as shown in FIG. 7B, the subcoding signal of the symbol S1 is read out at a point of timing offset from the read out timing of the di9ital data At this time, the digital data W21, W18, W15 and W12 are written into the addresses (5, 10, 14, 17) of the RAM as shown in FIG. 7C and the subcoding signal of the symbol S2 is written into the address 19 as shown in FIG. 7D. It should be noted that the write timing and the read timing are not overlapped each other As shown in FIG. 7E, error corrections of series C1 and C2 are executed in the frame t1 except when the RAM is accessed as shown in FIGS. 7A to 7D.

In the above described embodiment, the memory area, in which the subcoding signal is stored, and which is part of the RAM provided in the error correction circuit 25, can be constructed as a separate buffer circuit 40 employing an FIFO buffer memory.

Figure 8:
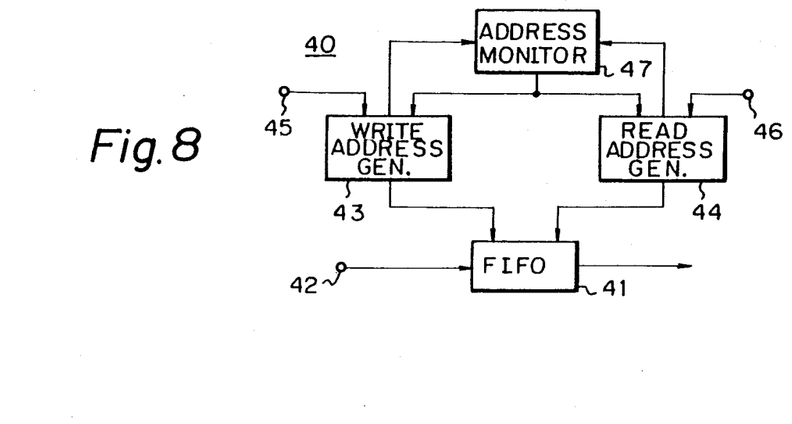
FIG. 8 is a block diagram showing a buffer circuit according to another embodiment.

In FIG. 8, the reference numeral 41 designates a FIFO (First-In-First-Out) buffer register 41, to which the reproduced subcoding signals from an input terminal 42, a write address from a write address generator 43 and a read address from a read address generator 44 are supplied, respectively. The FIFO buffer register 41 is such a memory as to sequentially store the input data and derive the output data in the order in which it is inputted, and is supplied independently with the write address and the read address.

The write address generator 43 is supplied from an input terminal 45 with a write frame clock in synchronism with the reproduced subcoding signals. The read address generator 44 is supplied with a read frame clock formed by frequency division of the output of the crystal oscillator As described before, the FIFO buffer register 41 outputs the subcoding signal from which the time base jitter is eliminated in the same manner as the digital data of the main channel. The reference numeral 47 designates an address monitor which is supplied with the write address and read address and for monitoring the difference between the write address and read address. The address monitor 47 serves to detect the probability of underflow or overflow of the FIFO buffer registor 41, as the time base jitter component included in the reproduced signal exceeds established range. The address monitor 47 controls the operation of the write and read address generators 43 and 44 so that, for example, a change in the write address is temporarily inhibited.

Figure 9:
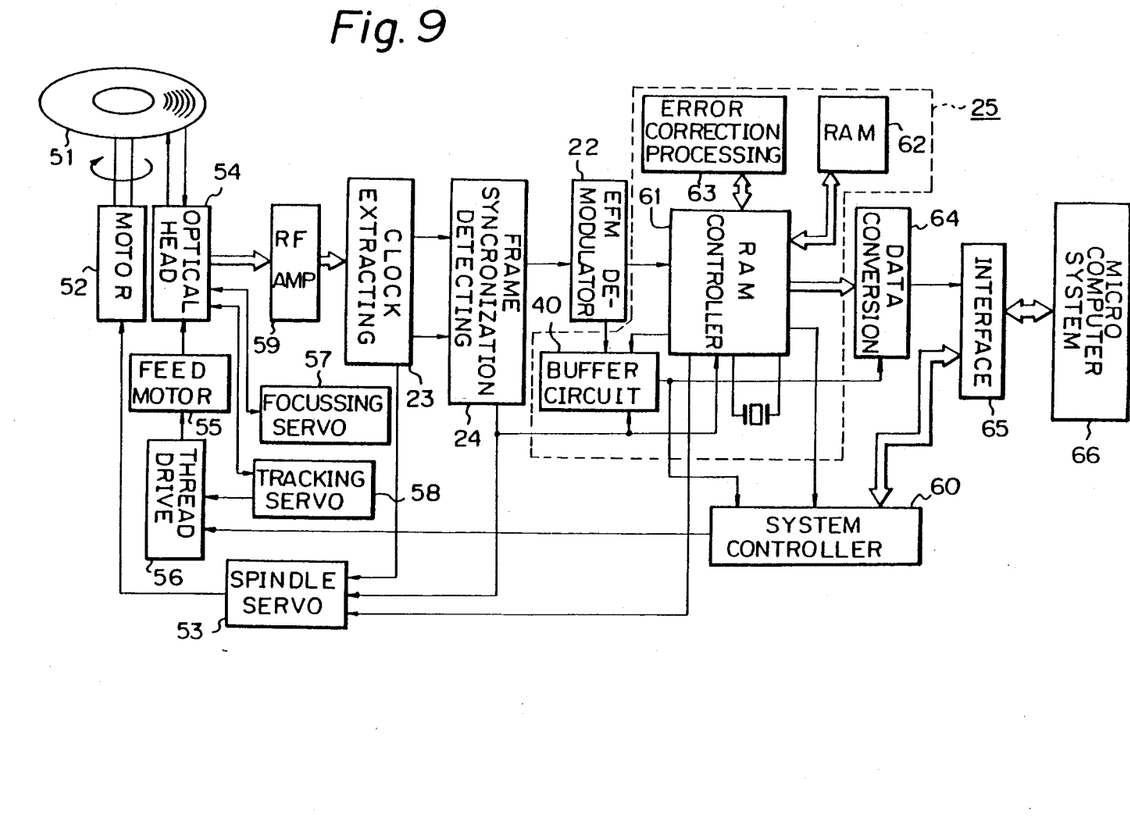
FIG. 9 is a block diagram showing entire structure of another embodiment of this invention.

FIG. 9 shows another embodiment of this invention employing the buffer memory constructed as described above, which is the more detailed reproducing circuit of FIG. 5. The reference numerals to those in FIG. 9 designate corresponding elements shown in FIG. 5.

In FIG. 9, the reference numeral 51 designates a compact disc on which digital signals of the format described above are recorded in a spiral. The compact disc 51 is rotated by means of a spindle motor 52. A spindle motor 52 is controlled by a spindle servo circuit 53 so as to rotate the compact disc 51 at a constant linear velocity.

The reference numeral 54 designates an optical head which includes a laser source for generating laser beam for reading, a beam splitter, an optical system such as an ob3ective lens, and a light-receiving element for receiving the laser beam reflected by the compact disc 51. The optical head 54 is so constructed as to move radially across the compact disc 51 by means of a threading feed motor 55. The threading feed motor 55 is driven by a thread driving circuit 56 The optical head 54 is displaceable in two directions, orthogonal to and parallel to the surface of the compact disc 51 so as to be controlled to continuously obtain the best focussing and tracking of the laser beam during reproduction. For this purpose, a focussing servo circuit 57 and a tracking servo circuit 58 are provided, respectively.

The reproduced signal from the optical head 54 is supplied to an RF amplifier 59. The optical head 54 is provided with a focussing error detecting part comprising a cylindrical lens and a square-array optical detectors, for instance, and a tracking error detecting part using three laser spots. The output signal of the RF amplifier 59 is supplied to a clock extracting circuit 23. The output (data and clock) of the clock extracting circuit 23 is supplied to the frame synchronization detecting circuit 24. The bit clock extracted by the clock extracting circuit 23 and the frame synchronizing signal detected by the frame synchronization detecting circuit 24 are supplied to the demodulator 22 and to the spindle servo circuit 53.

The subcoding signal is separated in the demodulator 22 and supplied to a system controller 60 through the above described buffer circuit 40 shown in FIG. 8. The system controller 60 is provided with a CPU and is so constructed as to control the rotation of the compact disc 51, the threading feed and reading by the optical head 54. The system controller 60 is supplied with control commands through an interface 65, to be described later. The system controller 60 carries out control processes using the subcoding signals to read out the desired digital signals from the compact disc 51.

The main digital data outputted from the demodulator 22 is supplied to the RAM 62 and the error correcting circuit 63 through the RAM controller 61. Time base jitter cancellation, error correction, and error concealment are performed by the RAM controller 61, RAM 62, and error correcting circuit 63, from which the main digital data is derived. When a compact disc on which an audio data is recorded is reproduced, a D/A converter may be connected to the RAM controller 61. Since digital data is taken out in this system, shown in FIG. 9 a D/A converter is not provide, and the reproduced data is supplied to the data conversion circuit 64. The data conversion circuit 64 is also supplied with the reproduced subcoding signals from the buffer circuit 40 so that the reproduced data is converted into a serial signal format.

The serial signal is supplied to the interface 65 and the data for the system controller 60 is supplied from the microcomputer system 66 through the interface 65. The microcomputer system 66 specifies a read address and supplies the interface 65 and the system controller 60 with drive controlling signals, such as a start signal other than the read address.

Figure 10:
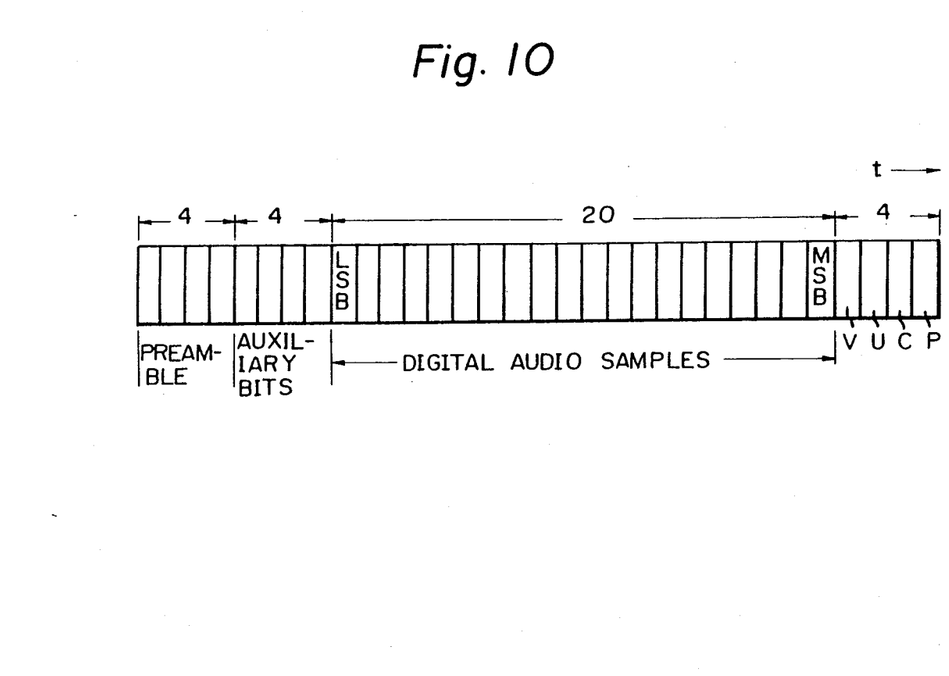
FIG. 10 is a schematic diagram showing a word format for serial data according to one embodiment of this invention.

FIG. 10 shows an example of the serial signal word format outputted from the data conversion circuit 64 The serial signal is comprised of 32 bits as one word; the first 4 bits serve as a preamble, the next 4 bits as auxiliary bits for audio data, and the following 20 bits as digital audio sampling data.

When an audio digital sample has 16 bits, the sample data of 16 bits is inserted from the least significant bit (LSB), and 4 bits are added subsequent to the audio digital sample. Among these 4 bits, the bit labelled "V" is a flag indicating whether the audio digital sample in that word is effective, the bit labelled "U" is one bit of the subcoding signal, the bit labelled "C" is a bit for identifying a channel, and the bit labelled "P" is a parity bit. The bits labelled "U" for the subcoding signal are inserted in each word bit by bit so as to be transmitted sequentially.

In this embodiment, the buffer circuit 40 eliminates the time base jitter from the subcoding signals. The compensation of time base is the same as that by the RAM controller 61 and the RAM 62 for the digital data of the main channel.

In more detail, the RAM controller 61 generates the write clock synchronized with the reproduced signal from the detected frame synchronizing signal. The digital signal is written into the RAM 62 in response to the write clock, and the read clock formed by the output signal from the crystal socillator is used to read out the digital signal from the RAM 62. The write clock and read clock are used to write and read the subcoding signals into and from the buffer circuit 40. Hence, the subcoding signals read from the buffer circuit 40 include no time base jitter so the time relationship of the digital signal of the main channel is not changed because of the time base jitter.

In this embodiment, the microcomputer system 66 executes a read instruction to read a predetermined address. The address is the code itself of the Q channel for indicating absolute time and is supplied to the system controller 60 through the interface 65. The system controller 60 controls the thread driving circuit 56 and moves the optical head 54 to a position near a reading position by monitoring the subcoding signals reproduced by the optical head 54. In this example, reproduction of the data starts from a position several blocks away from the reading position of the target in order to prevent malfunction. Thus an established subcoding signal is not reproducd because of errors included in the reproduced subcoding signals, and the access operation is not completed. The target block may be retrieved by either of two methods, namely by making the reproduced subcoding signals coincide with the specified address or by starting reproducition from a neighboring, correct subcoding signal and then counting the frame synchronizing signals.

According to the present invention, it is possible to achieve a disc storage device with a considerably larger storage capacity compared with a convetional flexible discs, and to read out digital signal in amounts suitable for processing.

According to the present invention, it is possible to record digital data other than stereo music signal on the conventional disc for recording stereo music signal such as the commercially available compact disc, while the identity of signal forms, such as the error correction method and the data recording format is maintained Furthermore, according to the present invention since a RAM for de-interleaving is employed for the compensation of the time base of the subcoding signals, it is possible to use almost all of the conventional reproduction processing circuitry for the compact disc and to achieve a low-cost system structure.

Furthermore, according to the present invention, it is possible to address the digital signal of the main channel simply by adding an external circuit without changing the conventional reproduction processing circuitry for the compact disc, which achieves the advantage of making it unnecessary to design a new LSI for the reproduction processing circuitry.

What is claimed is:

1. In an apparatus for playback from a disc, on which main digital data and subsidiary digital data, for selectively reproducing the main digital data, are recorded in multiplex fashion, said apparatus being responsive to control signals for designating the position on said disc from which said main digital data is reproduced, the combination comprising:

means for reproducing said main digital data and said subsidiary digital data, means for generating a write clock synchronized with a reproduced signal from the disc, means for generating a read clock having a predetermined period, a buffer memory, means for writing main digital data reproduced form the disc into said buffer memory in response to the write clock and means for reading out said buffer memory in response to the read clock, a first in-first out buffer register, means for writing the subsidiary digital data reproduced from the disc into said FIFO buffer register in response to the write clock and means for reading out said FIFO buffer register in response to the read clock, and control means connected to said FIFO buffer register for designating a position on said disc to reproduce said main digital data in response to the subsidiary digital data read form the FIFO buffer register.

2. An apparatus for playback from a disc according to claim 1, characterized in that one block of said main digital data consists of a plurality of frames, each block including a header signal, an address information signal and a data information signal.

3. Apparatus according to claim 1, including a write address generator and a read address generator connected to said FIFO buffer register for simultaneously manifesting addresses for writing and reading, respectively.

4. In an apparatus for playback from a disc on which main digital data and subsidiary digital data, for selectively reproducing the main digital data, are recorded in multiplex fashion, the combination:

means for generating a read clock signal and a write clock signal in synchronism with digital data reproduced from the disc, a buffer memory for storing main digital data and subsidiary digital data reproduced from the disc in synchronism with said write clock signal, means for addressing said buffer memory and for reading out said main digital data and said subsidiary digital data from said buffer memory in response to the read clock, whereby the main digital data is de-interleaved, and control means for seeking a position at which said main digital data is to be reproduced in response to the subsidiary data digital read from said buffer memory.

* * * * *